US007425706B2

(12) United States Patent
Hoy

(10) Patent No.: US 7,425,706 B2
(45) Date of Patent: Sep. 16, 2008

(54) GAMMA-RAY LASER; INDUCED GAMMA EMISSION SYSTEM AND METHOD

(75) Inventor: Gilbert R. Hoy, 7320 Glenroie Ave. #4G, Norfolk, VA (US) 23505

(73) Assignee: Gilbert R. Hoy, Norfolk, VA (US)

( * ) Notice: Subject to any disclaimer, the term of this patent is extended or adjusted under 35 U.S.C. 154(b) by 115 days.

(21) Appl. No.: 11/358,744

(22) Filed: Feb. 22, 2006

(65) Prior Publication Data

US 2008/0087838 A1 Apr. 17, 2008

(51) Int. Cl.
*H01S 4/00* (2006.01)
(52) U.S. Cl. .............................. 250/339.01; 250/269.3; 250/370.09; 372/33; 372/702; 372/25; 372/26; 372/5
(58) Field of Classification Search ............... 250/369.3, 250/370.09; 372/33, 702, 25, 26, 5
See application file for complete search history.

(56) References Cited

U.S. PATENT DOCUMENTS

| | | | | | |
|---|---|---|---|---|---|
| 4,363,965 | A | * | 12/1982 | Soberman et al. | ............ 250/302 |
| 4,809,285 | A | * | 2/1989 | Scully | ........................ 372/33 |
| 4,939,742 | A | * | 7/1990 | Bowman | ...................... 372/5 |
| 5,256,849 | A | * | 10/1993 | Scully | .................. 219/121.68 |
| 5,617,443 | A | | 4/1997 | Ikegami | |
| 5,815,517 | A | | 9/1998 | Ikegami | |
| 5,887,008 | A | | 3/1999 | Ikegami | |
| 2002/0186805 | A1 | | 12/2002 | Soloway | |

OTHER PUBLICATIONS

Proc. of the Int. Gamma Ray Laser conference (GARALAS '97), Hyp. Int. 107 (1997).
Hyperfine Interactions, vol. 107, Nos. 1-4, Mar. 1997, pp. 401-411: Collective polynuclear superradiance rather than stimulated emission of Mössbauer radiation from $^{125m2}$Te and $^{123m2}$Te, G.A. Skorobogatov and B.E. Dzevitskii.
Vysotskii et al, "Efficiency of excitation of highly active nuclear systems in the gamma-resonant medium heated by the laser pulse", Plasma Physics Reports -- Dec. 1997 -- vol. 23, Issue 12, pp. 1046-1055.
Collins et al, "Coherent and incoherent pumping of a gamma ray laser with intense optical radiation", J. Appl. Phys., vol./Issue: 53:7, pp. 4645-4651, Jul. 1982.

(Continued)

*Primary Examiner*—David Porta
*Assistant Examiner*—Djura Malevic
(74) *Attorney, Agent, or Firm*—Miles & Stockbridge P.C.

(57) ABSTRACT

A method for producing stimulated emission of gamma radiation comprising:
 1] providing at least first and second gamma-radiation sources, both sources being in recoil-free first-excited nuclear levels and the second source being in resonance with the first source and the gamma radiation from the first source being incident on the second source,
 2] during the lifetime of its excited state, abruptly moving the first source through a distance equal to ½ the wavelength of the radiation emitted therefrom, thereby inducing a π-phase-shift gamma radiation transparency in the second source whereby the π-phase-shifted gamma radiation stimulates the excited nuclear resonant state of the second source to emit gamma radiation.

9 Claims, 4 Drawing Sheets

OTHER PUBLICATIONS

Baldwin et al, "Prospects for a gamma-ray laser", Physics Today, vol. 28, Feb. 1975, p. 32-39; Baldwin et al, Rev. Mod. Phys. 69, 1085-1118 (1997).

Coussement, et al, "Quantum optics with gamma radiation", Europhysics News (2003) vol. 34 No. 5.

G. C. Baldwin, J. C. Solem, and V. I.Goldanskii, Rev.Mod.Phys. 53, 4 (1981).

C. B. Collins et al., Phys. Rev. Lett. 82, 695 (1999).

J. J. Carroll et al., Hyp. Int. 135, 3 (2001).

C. B. Collins et al., Hyp. Int. 135, 51 (2001).

U. Köster et al., Nucl. Instr. and Meth. in Phys. Res. B 160, 528 (2000).

C. Lui et al., Nature 409, 490 (2001).

D. F. Phillips et al., Phys. Rev. Lett. 86, 783 (2001).

A.B.Matsko et al., Advances in Atomic, Molecular and Optical Physics 46, 191 (2001).

R. Coussement et al., Phys. Rev. Lett. 71, 1824 (1993).

M. O. Scully and M. S. Zubairy, *Quantum optics* Cambridge University Press (1997) p. 220.

G. R. Hoy, J. Phys: Condensed Matter 9 (1997) 8749.

P. Helisiö, I. Tittonen, M. Lippmaa, and T. Katila, Phys. Rev. Lett. 66 (1991) 2037.

I. Tittonen, M. Lippmaa, P. Helistö, and T. Katila, Phys. Rev. B 47 (1993) 7840.

G. R. Hoy and J. Odeurs, Phys. Rev. B 63 (2001) 64301.

G. R. Hoy, Encyclopedia of Physical Science and Technology vol. 10 p. 469 (Academic New York) 1992.

F. J. Lynch, R. E. Holland, and M. Hamermesh, Phys. Rev. 120 (1960) 513.

W. Neuwirth, Z. Phys. 197 (1966) 473.

W. Triftshauser and P. P. Craig, Phys. Rev. 162 (1967) 274.

D. W. Hamill and G. R. Hoy, Phys. Rev. Lett. 21 (1968) 724.

G. R. Hoy and P. P. Wintersteiner, Phys. Rev. Lett. 28 (1972) 877.

\* cited by examiner

GAMMA-RAY LASER; INDUCED GAMMA EMISSION SYSTEM AND METHOD

BACKGROUND OF THE INVENTION

1. Field of the Invention

The invention relates to methods and systems for inducing gamma radiation emission and a gamma-ray laser system.

2. Description of the Prior Art

Stimulated emission of gamma radiation has never been unambiguously observed. Thus, it has always been assumed that the major goal of gamma-ray optics; namely, to produce a gamma ray laser, would require further fundamental research. If gamma-ray lasers could be developed there are many applications to; industrial processing, weapons development, communications, cancer treatment, as well as holographic observations of chemical processes, to mention a few. The reason for the usefulness of such a device is due to the coherence properties of laser light. However, gamma ray lasers do not, at present, exist. Of course ordinary laser action is based on stimulated emission. Without stimulated gamma emission, it is not possible to have gamma-ray lasing. As is well known, atomic physicists have already developed ordinary lasers, which arise from electromagnetic transitions in atoms. In fact, even x-ray lasers do exist now. For a gamma-ray laser, one must consider electromagnetic transitions in nuclei.

One of the important issues raised when considering the possibility of a gamma-ray laser is "lasing without inversion." To summarize the point, if incident resonant radiation interacts with a system in which there are more resonant atoms in the ground state then in the excited state, there is more absorption than stimulated emission. Under this condition one cannot make a laser. The concept of "lasing without inversion" is based on the notion than one can, somehow, produce a ground state whose transition probability to go up to the excited state is zero while there still is a non-zero possibility of stimulated emission. Such ground states have been called "dark" states. Since the discovery of optical lasers, the scientific community has been interested and challenged to realize a gamma ray laser [see for example, Proc. of the Int. Gamma Ray Laser conference (GARALAS'97), Hyp. Int. 107 (1997); Hyperfine Interactions, Volume 107, Numbers 1-4, March 1997, pp 401-411: "Collective polynuclear superradiance rather than stimulated emission of Mössbauer radiation from $^{125m2}$Te and $^{123m2}$Te, G. A. Skorobogatov and B. E. Dzevitskii; Vysotskii et al, "Efficiency of excitation of highly active nuclear systems in the gamma-resonant medium heated by a laser pulse", Plasma Physics Reports—December 1997— Volume 23, Issue 12, pp. 1046-1055; Collins et al, "Coherent and incoherent pumping of a gamma ray laser with intense optical radiation", J. Appl. Phys., Vol/Issue: 53:7, Pages: 4645-4651, July, 1982; Baldwin et al, "Prospects for a gamma-ray laser", Physics Today, vol. 28, February 1975, p. 32-39; Baldwin et al, Rev. Mod. Phys. 69, 1085-1118 (1997)].

A gamma ray laser would offer many applications because of the short wavelength and because of the high power density. Despite the considerable efforts of many groups, there still exists no idea of how to build such a device using present technology and our available knowledge of laser, nuclear and atomic physics.

The main problem is the realization of population inversion. Indeed, as recently as 2003, it has been postulated that gamma lasing without population inversion is impossible [see Coussement, et al, "Quantum optics with gamma radiation", Europhysics News (2003) Vol. 34 No. 5]. For some time there has existed the so called gamma laser dilemma [G. C. Baldwin, J. C. Solem, and V. I. Goldanskii, Rev. Mod. Phys. 51, 4 (1981); G. C. Baldwin and J. C. Solem, Laser Phys. 5, 231, 326 (1995)].

To try to circumvent this dilemma, it had previously been thought necessary to follow one of two avenues. They have in common the storage of energy in long-lived isomers and finding a mechanism to release it on command. Storing large amounts of energy in nuclear isomers is not the real challenge, however. One can produce these long-lived isomers in nuclear reactors or with accelerator beams and separate them from other types of material by chemical and/or physical means. The technology is available in principle or at least there is enough knowledge available for it to be developed. The problem is the release of the stored energy 'on command' and in a very short time. It is on this point that the two approaches diverge conceptually.

One of the roads followed is to pump a long-lived nuclear isomer into an excited nuclear state via low energy X-ray irradiation. Subsequently, this excited state decays via the emission of gamma rays, representing a multiple of the input energy. In this scenario the long-lived isomeric state could act as a nuclear battery, in which energy is stored. A proof of principle for releasing the stored energy has been demonstrated using a K-isomer as the storage level [C. B. Collins et al., Phys. Rev. Lett. 82, 695 (1999); J. J. Carroll et al., Hyp. Int. 135, 3 (2001); C. B. Collins et al., Hyp. Int. 135, 51 (2001)].

From the point of view of nuclear models the result is surprising. Indeed, the K-isomeric state has a long lifetime because the K-selection rule hinders its decay into nuclear states at lower energy as this involves a large change in the projection of the angular momentum. It comes as a surprise that the transitions to higher energy states in this ground state band are then less affected by this hindrance. Although it is an interesting phenomenon for nuclear spectroscopists; because of the weak coupling of the X-ray pump with the possible lasing level, it is not yet an efficient mechanism for producing a gamma ray laser.

A prime condition for gain with stimulated emission is population inversion, or explicitly, the number of excited state nuclei from which lasing has to occur, exceeds the number of ground state nuclei. This condition requires that one be able to perform a nuclear isomeric separation in order to obtain nearly pure isomeric material. Such a technology could be developed in the future, for example, using the laser ionization method for producing isomeric enrichment, the separation being based on the difference in the hyperfine structure [U. Köster et al., Nucl. Instr. and Meth. in Phys. Res. B 160, 528 (2000)].

Even if a solid material could be prepared with most of the nuclei in the ground state as well as a large number in some long lived isomeric state, without having an inverted system, lasing might still be realized. To obtain lasing from such a system, the concept of "lasing without inversion" as introduced in quantum optics, could be translated to gamma radiation. In the optical range the effect of "lasing without inversion" has been demonstrated experimentally [C. Liu et al., Nature 409, 490 (2001); D. F. Phillips et al., Phys. Rev. Lett. 86, 783 (2001); A. B. Matsko et al., Advances in Atomic, Molecular and Optical Physics 46, 191 (2001)] and it was pointed out that the main new application will be the realization of lasers at very high frequency, for example UV, X-ray or even a gamma ray laser. The main point here is that one can create coherence in a three level system in such a way that absorption of the lasing frequency is cancelled by destructive interference while the emission, and in particular the stimulated emission, is not [R. Coussement et al., Phys. Rev. Lett. 71, 1824 (1993)].

In optics one can coherently excite two atomic levels by irradiating the atoms with two lasers of different frequency (color) but coupled in phase. Such phase-locked, two-frequency laser light is called 'bichromatic light' and can easily be obtained from one laser using frequency doubling or dividing crystals. However, an equivalent tool does not, at present, exist in gamma optics. Several unsuccessful attempts to produce stimulated gamma emission are described in U.S. Pat. Nos. 5,617,443; 4,939,742; 5,815,517; 5,887,008 and U.S. Application Publication no. 2002/0186805.

Ordinary laser action is based on stimulated emission. This occurs when incident light "stimulates" an atom to emit the same kind of light. An atom can emit light if a transition is made from a higher energy state to a lower energy state. The problem is, an atom can also absorb light with the same probability. If the light is absorbed, then none is available to provide stimulated emission. This is the reason for the term "population inversion", that is used to explain ordinary lasers. If there are more atoms in the excited state than in the ground state, one can produce a laser. To summarize the point, if incident resonant radiation interacts with a system in which there are more resonant atoms in the ground state then in the excited state, there is more absorption than stimulated emission; hence one cannot make a laser under these conditions.

This population inversion appears to be very difficult to achieve using nuclei. However, the atomic physicists have also discovered another important result. This has been termed "lasing without inversion" [See for example, M. O. Scully and M. S. Zubairy, *Quantum optics* Cambridge University Press (1997) page 220]. Thus, suppose there is some way in which the incident radiation is not absorbed. Then, of course, this radiation can provide the required stimulated emission.

It is an object of the present invention to provide a gamma laser system and method and a method and system for producing and observing stimulated gamma radiation emission.

SUMMARY OF THE INVENTION

The above and other objects are realized by the invention, one embodiment of which relates to a method for producing stimulated emission of gamma radiation comprising:

1] providing at least first and second gamma-radiation sources, both sources being in recoil-free first-excited nuclear levels and the second source being in resonance with the first source and the gamma radiation from the first source being incident on the second source, 2] during the lifetime of its excited state, abruptly moving the first source through a distance equal to ½ the wavelength of the radiation emitted therefrom, thereby inducing a π-phase-shift gamma radiation transparency in the second source whereby the π-phase-shifted gamma radiation stimulates the excited nuclear resonant state of the second source to emit gamma radiation.

Another embodiment of the invention relates to a system for producing stimulated emission of gamma radiation comprising:

1] at least first and second gamma-radiation sources, both sources being in recoil-free first-excited nuclear levels and positioned such that gamma radiation from the first source is incident on the second source, the second source being in resonance with the first source 2] means for abruptly moving the first source through a distance equal to ½ the wavelength of the radiation emitted from the first source, thereby inducing a π-phase-shift gamma radiation transparency in the second source to stimulate the excited nuclear resonant state of the second source to emit gamma radiation.

A further embodiment of the invention concerns a method for the detection and measurement of stimulated emission of gamma radiation produced by the above-described method comprising placing a gamma-radiation detector behind both of the sources, measuring the gamma radiation incident on the detector and determining the excess radiation above that produced by the first and second sources without inducing a π-phase-shift gamma radiation transparency in the second source and quantifying the excess radiation as stimulated emission of gamma radiation by the second source.

A still further embodiment of the invention relates to another method for the detection of stimulated emission of gamma radiation produced by the above-described method comprising placing a gamma-radiation detector behind both of the sources, comparing the pulse-height spectrum of the radiation produced by the method with the pulse-height spectrum produced by the sources without inducing a π-phase-shift gamma radiation transparency in the second source and quantifying the differences therebetween as stimulated emission of gamma radiation by the second source.

A further embodiment of the invention concerns a system for the detection and measurement of stimulated emission of gamma radiation produced by the above-described system comprising a gamma-radiation detector positioned behind both of the sources for measuring the gamma radiation incident on the detector and means for determining the excess radiation above that produced by the first and second sources without inducing a π-phase-shift gamma radiation transparency in the second source and quantifying the excess radiation as stimulated emission of gamma radiation by the second source.

Another embodiment of the invention relates to a system for the detection of stimulated emission of gamma radiation produced by the above-described system comprising a gamma-radiation detector positioned behind both of the sources, means for comparing the pulse-height spectrum of the radiation produced by the system with the pulse-height spectrum produced by the sources without inducing a π-phase-shift gamma radiation transparency in the second source and quantifying the differences therebetween as stimulated emission of gamma radiation by the second source.

DETAILED DESCRIPTION OF THE INVENTION

Figure 1:
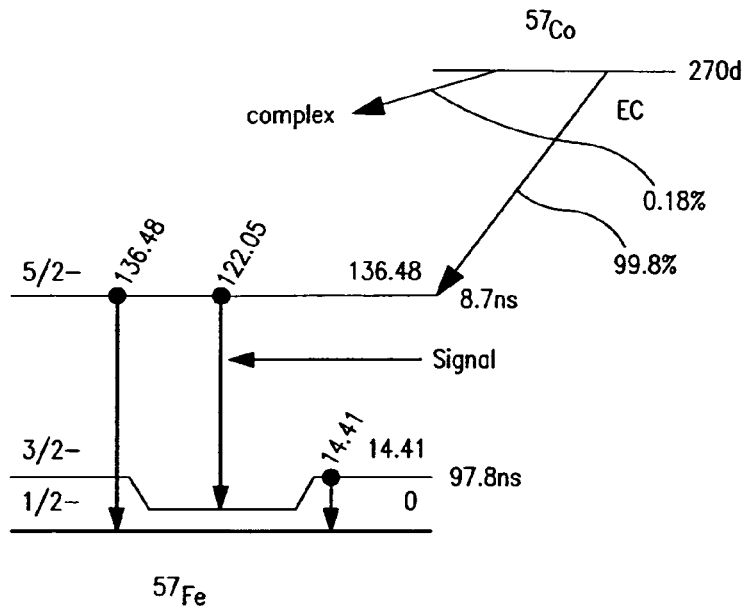
FIGS. 1, 3, 4, 6 and 7 are graphical depictions of various aspects of the invention.

The present invention is predicated on the discovery of a technique for rendering a second gamma source 'transparent' to gamma radiation rather than reactive or absorptive thereof such that, when irradiated with gamma radiation from a first gamma source, the second gamma source, instead of absorbing or reacting with the irradiation, is stimulated thereby to emit gamma radiation.

Ordinary laser action is based on stimulated emission. This occurs when incident light "stimulates" an atom to emit the same kind of light. An atom can emit light if a transition is made from a higher energy state to a lower energy state. The problem is, an atom can also absorb light with the same probability. If the light is absorbed, then none is available to provide stimulated emission. This is the reason for the term "population inversion", that is used to explain ordinary lasers. If there are more atoms in the excited state than in the ground state, one can produce a laser. To summarize the point, if incident resonant radiation interacts with a system in which there are more resonant atoms in the ground state then in the excited state, there is more absorption than stimulated emission; hence—no laser.

This population inversion is very difficult, if not impossible, to achieve using nuclei. However, atomic physicists have discovered an important result; termed "lasing without inversion" [See for example, M. O. Scully and M. S. Zubairy, *Quantum optics* Cambridge University Press (1997) page 220]. Thus, if the incident radiation is not absorbed, this radiation can provide the required stimulated emission.

The present invention is predicated on the discovery of a way to accomplish this using a nuclear system. In the course of the research leading to the invention there was developed a theory called the "coherent-path model for nuclear resonant scattering" [G. R. Hoy, J. Phys: Condensed Matter 9 (1997) 8749]. Using this theory the present inventor has been able to re-interpret the so-called "gamma-echo" experiments performed by a Finnish team [P. Helistö, I. Tittonen, M. Lippmaa, and T. Katila, Phys. Rev. Lett. 66 (1991) 2037; 1. Tittonen, M. Lippmaa, P. Helistö, and T. Katila, Phys. Rev. B 47 (1993) 7840]. The "gamma-echo" effect is actually due to a π phase-shift induced transparency [G. R. Hoy and J. Odeurs, Phys. Rev. B 63 (2001) 64301]. The point is, using these procedures, the absorber becomes transparent to the gamma radiation, i.e., the absorber does not absorb the gamma radiation. In this very unusual way gamma radiation is available to provide the required stimulated emission.

Rudolph Mössbauer [R. L. Mössbauer, Z. Physik 151, 124 (1958)] discovered the recoil-free emission and absorption of gamma radiation. Subsequently the Mössbauer effect has seen application [see for example G. R. Hoy, Encyclopedia of Physical Science and *Technology* vol. 10 page 469 (Academic New York) 1992] to many branches of physics. Very soon, after Mössbauer's discovery, time-differential transmission experiments [F. J. Lynch, R. E. Holland, and M. Hamermesh, Phys. Rev. 120 (1960) 513] were done. Interesting experimental results [W. Neuwirth, Z. Phys. 197 (1966) 473; W. Triftshauser and P. P. Craig, Phys. Rev. 162 (1967) 274; D. W. Hamill and G. R. Hoy, Phys. Rev. Lett. 21 (1968) 724; G. R. Hoy and P. P. Wintersteiner, Phys. Rev. Lett. 28 (1972) 877] were found using this time-differential Mössbauer spectroscopic (TDMS) method.

The gamma-echo experiments use a modification of the TDMS experimental technique. In the TDMS technique the gamma-ray source emits recoil-free gamma radiation. This radiation is incident on a gamma-ray absorber. The gamma radiation that goes through the absorber is detected in delayed coincidence with respect to the formation of the first-excited state in the source. In such experiments a precursor event signals the formation of the first-excited nuclear level in the source that will subsequently decay to the ground state by emission of a recoil-free gamma ray. Thus a type of "lifetime curve", as used in nuclear physics to measure the lifetime of a nuclear state, is obtained (see FIG. 1 in G. R. Hoy and J. Odeurs, Phys. Rev. B 63 (2001) 64301). (In the nuclear physics experiments there is no absorber present.) However, in the experiments leading to the present invention there is a resonant absorber and the resonant source radiation will interact with the resonant nuclei in the absorber before reaching the detector. The resulting time-dependent intensity curve is different from that obtained by nuclear physicists. Instead of an ordinary exponential shape, one obtains a more rapid decrease in the time-dependent intensity. Such results are interesting in their own right, but are not important to the present disclosure.

In the gamma-echo technique one uses the same set-up as for TDMS, but now the gamma-ray radioactive source is moved abruptly, at a time to, during the lifetime of gamma-ray source state. This introduces a phase shift between the source gamma radiation and the gamma radiation that will come from the absorber. If the source is moved abruptly, introducing a π-phase-shift, the absorber becomes transparent for all times after to up to about 4 or 5 nuclear lifetimes. To reiterate, in this gamma-echo method, the gamma-ray source is moved abruptly, relative to a gamma-ray absorber, during the lifetime of the source's first-excited nuclear state. When the gamma-ray source is moved, there is a phase shift introduced into the source radiation, and when the phase-shift equals π, the absorber suddenly re-radiates gamma-rays forward. At the "instant" of the π-phase-shift, the absorber becomes transparent to the source gamma radiation.

In this very unusual way, the absorber does not absorb the incident radiation. Now, to make the gamma-ray laser, replace the absorber with another gamma source. Now after the π-phase-shift the gamma radiation can easily pass through the second source. Thus the original source gamma radiation is available to stimulate the excited state in the second source. This gamma radiation will now stimulate the first-excited state in this second source to emit gamma radiation.

There are two ways to determine if this really happens. First, one must observe that there is more radiation coming into the detector than would be the case compared to the ordinary gamma-echo method. Of course, due to the second source, there will be more radiation coming to the detector. However the important issue is to determine whether this extra radiation is due to stimulated gamma emission or not. This can be determined by doing the same experiment without introducing the phase shift. A further test involves examining pulse-height spectrum, i.e. the number of gamma rays as a function of their energy, as determined by the gamma radiation detector. If one finds energy peaks at multiples of the incident gamma ray energy, this would indicate success. However, one must check against so-called "pile-up" effects. This will happen if two unrelated gamma rays accidentally reach the detector at the same time. This possibility can be ruled out also by doing the same experiment without introducing the phase shift. Positive results indicate stimulated gamma emission. In addition, a very unusual random-pulsed, weak, gamma-ray laser is produced. Simply increasing the strength of the secondary gamma source, i.e. the one replacing the absorber in the ordinary "gamma-echo" case, will increase the intensity of the resulting gamma-ray laser.

The methods and systems in the following non-limiting examples are based on the stimulated emission of gamma radiation. Such stimulated emission of gamma radiation has never been observed; however, it is essential for developing gamma-ray lasers. The invention involves the use of the 'π phase-shift induced transparency' of gamma radiation, previously called the 'gamma echo'. The gamma-echo technique is based on a modification of the time-differential Mössbauer spectroscopic method, i.e. the source is moved 'instantaneously' during the lifetime of the excited state. Then a resonant absorber becomes transparent to the resonant gamma radiation. There is a type of 'self-stimulated' emission in which the radiation 'absorbed', before the phase shift, is stimulated to emit after the phase shift. To produce and observe stimulated emission of the resonant gamma radiation, one performs the same gamma-echo experiment except the resonant absorber is replaced by another source. This secondary source is chosen to be in resonance with the original source. Under these conditions there will be no stimulated emission in the secondary source before the π phase shift because the incident radiation is absorbed. However, after the phase shift, the secondary source becomes transparent to the incident radiation. If one, for example, uses a matched pair of $Co^{57}$ sources and the secondary source is 2 mCi, there will be about 3 nuclei in the secondary source in the first excited state of $Fe^{57}$ that are available to be stimulated during the 97.8 ns lifetime of the primary source radiation.

EXAMPLE 1

Figure 8:
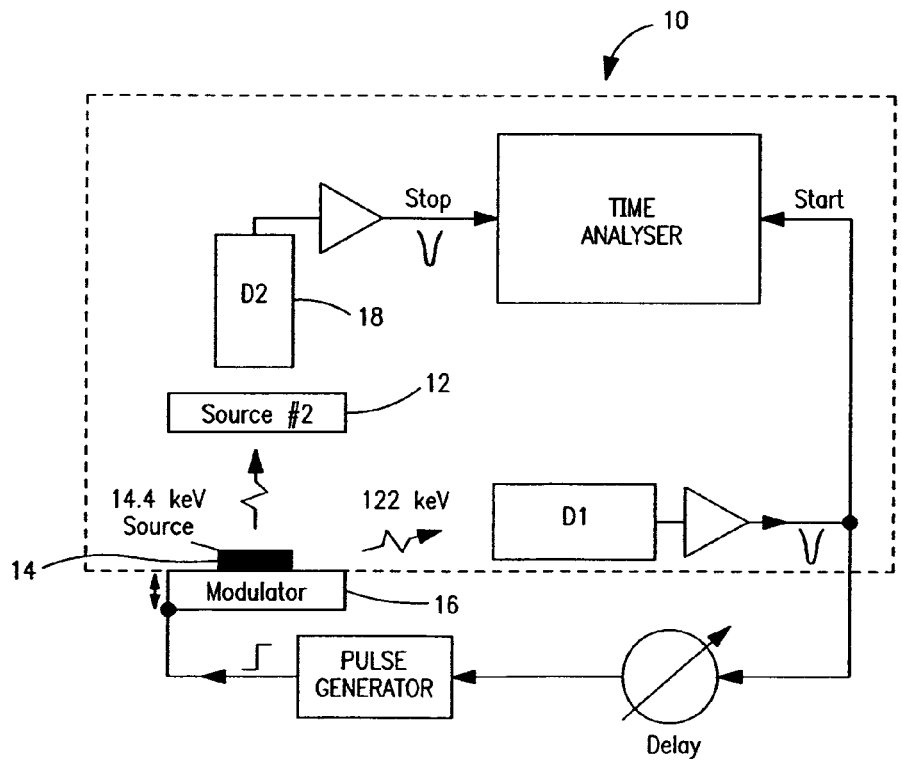

In order to observe stimulated emission of resonant gamma radiation one performs the same "gamma-echo" experiment described above employing the system 10 depicted in FIG. 8. The second source 12 must be in resonance with the primary source 14. If one uses a matched pair of $^{57}Co$ sources, and the secondary source is 2mCi, there will be about 3 nuclei, in the secondary source, in the first excited state of $^{57}Fe$ that are available to be stimulated during the 140 ns lifetime of the primary source. As noted above, to observe stimulated gamma-ray emission one needs a system in which absorption is suppressed, while emission is allowed. Otherwise the radiation providing the stimulation will simply be absorbed and hence will not be available to provide the stimulation.

In the method, a precursor gamma ray signals the formation of the recoil-free first-excited nuclear level in a gamma-ray source. One then detects the emitted recoil-free gamma ray, as a function of time after formation of the excited state, after passing through a nuclear resonant absorber. If, during the lifetime of the source excited state, the source is moved abruptly by modulator 16 through a distance equal to one-half the wavelength of the emitted radiation, the radiation detected behind the absorber, at that time, jumps immediately to a very high value, i.e., the so called "gamma echo." Absorption is suppressed, while emission continues.

Stimulated gamma-ray emission is produced by replacing the resonant gamma-ray absorber with a second gamma-ray resonant source 12. Now, after the π-phase-shift, the radiation can easily pass through the secondary gamma-ray source 12. Since the source radiation can pass through the second source, the radiation is available to stimulate the first excited nuclear resonant state of the secondary source. This effect will show up experimentally in two ways. The experiment is performed using the familiar Mössbauer-effect $^{57}Co$ sources. It will be understood that any suitable Mössbauer isotope may be employed in the practice of the invention, including $^{57}Co$, $^{57}Fe$, $^{119}Sn$ $^{57}Fe$, $^{119}Sn$, $^{125}Te$, $^{151}Eu$, $^{121}Sb$, $^{129}I$, $^{141}Pr$, $^{237}Np$, $^{197}Au$, $^{161}Dy$ (25.655 keV) and any M1, E1, E2, M1+E2 with $I_g$, $I_c$ less or equal ½ and the like.

First, we will find that there is more radiation coming to the detector 18, than would be the case in the ordinary gamma-echo method. This will be over and above that due to the secondary source itself, which will only give a higher counting rate in background i.e. this radiation will have no time relationship to t=0. (In order for this to be true, the 122 keV ("t=0") detector should not "see" the secondary source.) Furthermore, when examining the pulse-height spectrum, we may see a 28.8 keV pulse. This would be the consequence of the stimulated 14.4 keV photon, due to $^{57}Fe$ nuclear transition, and the stimulating 14.4 keV photons arriving together at the detector within the resolution time of the detector. If there are no 28.8 keV pulses in the pulse-height spectrum, one would see an increase in the intensity in the gamma-echo peak due to the 14.4 keV photons. If the 28.8 keV pulse is seen in the detector, one can check if it is simply due to an accidental pile-up double peak by recording the pulse-height spectrum without introducing the π-phase-shift.

Thus, one can determine the accidental pile-up rate. These tests confirm that stimulated emission of gamma radiation has occurred. If the secondary source is 2mCi, there will be about 3 nuclei in first excited state of $^{57}Fe$ that are available to be stimulated during the 140 ns lifetime of the primary source, thus producing a gamma-ray laser. Using the gamma-ray detectors to look for a sum peak at, for example, 28.8 keV, requires detection of such events over and above the accidental-coincidence counts. This proves to be quite difficult because of the relatively more numerous accidental-coincidence counts. Thus, one could also use a detection system that measures the intensity and not just the energy because the two photons, in the accidental-coincidence case, will not lie exactly on top of each other in time. However, the two photons in the stimulating case will have the 28.8 keV energy delivered in about a lifetime, i.e. 100 nsec. The 28.8 keV energy, in the accidental coincidence case, will most often be delivered over a much larger time interval. Thus measuring the intensity in the two-photon coincidence case will more clearly show the stimulated emission effect. Speaking figuratively, one would look for a detection scheme in which a "hole" is made in the detector when stimulated emission occurs, and no hole is produced by the accidental coincidences.

EXAMPLE 2

(a) Time Differential Mössbauer Spectroscopy (TDMS)

Figure 2:
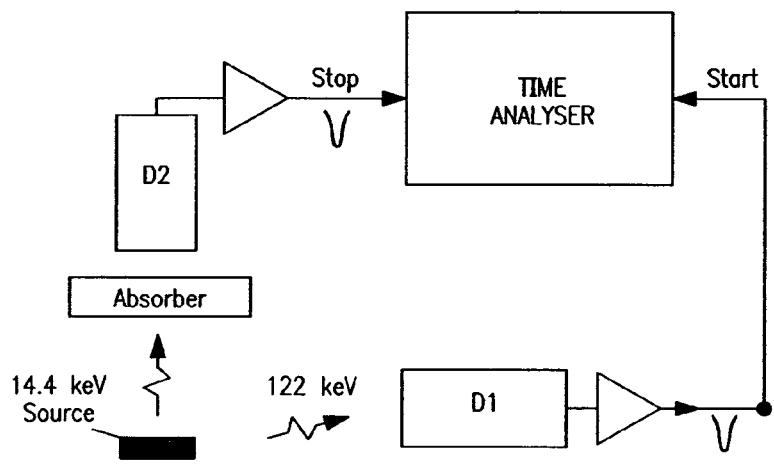
FIGS. 2, 5 and 8 are schematic representations of the various systems described in the application.

The experimental procedure is based on those used in time differential Mössbauer spectroscopy (TDMS). We consider here the familiar nuclide $^{57}Fe$ for concreteness. FIG. 1 shows the decay scheme of $^{57}Co$, and the "signal" gamma ray that indicates that the 14.4 keV first excited state in $^{57}Fe$ has been formed. FIG. 2 gives a schematic diagram of the TDMS apparatus. This set-up, if the absorber is not present, can be used in nuclear physics to measure the lifetime of the 14.4 keV level. With the absorber in place Lynch et al. [1960, Phys. Rev., 120,513] performed the pioneering research. Other research followed [Neuwirth, W., 1966, Z. Phys., 197, 473; Triftshauser, W., and Craig, P. P., 1967 Phys. Rev., 162, 274; Hamill, D. W., and Hoy, G. R., 1968, Phys. Rev. Lett., 21, 724; Hoy, G. R., and Wintersteiner, P. P., 1972, Phys. Rev., Lett. 28, 877]. Such experiments have been termed "time filtering" experiments. These experiments are single photon experiments. The detection of the 122 keV photon sets time equal to zero [t=0]. The resulting 14.4 keV photon is recorded in a multi-channel analyzer in the time channel equal to the time delay from zero. The experimental results show a marked difference from an ordinary exponential lifetime curve.

Figure 3:
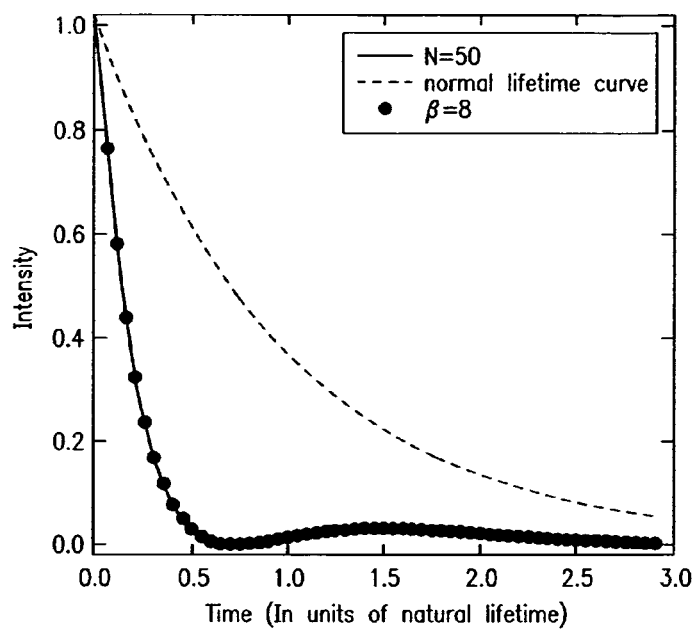

FIG. 3 shows simulated results using the "coherent-path" model for nuclear resonant forward scattering [Hoy, G. R., 1997, J. Phys: Condensed Matter, 9, 8749]. In FIG. 3 the dotted curve is simply an exponential curve corresponding to the 97.8 ns lifetime of the 14.4 keV level. The other two curves show calculated results assuming a certain thickness of the absorber, i.e. the values of β and N. The parameter β is the optical thickness that is used in the semi-classical optical model calculation. N is a parameter used in the coherent-path model that scales linearly with β. In the coherent-path model the nuclear resonant absorber is taken to be a one-dimensional chain of N "effective" nuclei, or equivalently, a set of N parallel planes of nuclear matter through which the incident radiation passes. The resulting amplitude for radiation passing through the sample takes a simple form when the absorber is on resonance. The equation is, $$\psi_r(t') = \psi_r^{source}(t')\left[1 + \sum_{n=1}^{N} \binom{N}{n}\left(-\frac{\Gamma_r t'}{2\hbar}\right)^n \frac{1}{n!}\right]$$

where $\psi_r^{source}(t')$ is due to the source alone, $\Gamma_r$ is the radiative width, and t' is the time measured from the time of formation of the first excited nuclear level in the source. The second term takes account of the absorber and has a simple interpretation. We see that the second term is a sum of amplitudes. Each amplitude corresponds to a particular "path" the radiation takes in going through the absorber. For example, the path n=1 refers to radiation that interacts with one effective nucleus (or plane) on reaching the detector. Of course there are N such terms. The path n=2 refers to radiation that has interacted, in the forward direction, with two effective nuclei (or planes) on reaching the detector. There are the binomial coefficient $$\binom{N}{2}$$

number of such terms. The other terms correspond to the additional paths. The intensity transmitted through the absorber is found by evaluating $|\psi_r(t')|^2$. Such calculations are in good agreement with the experimental data.

Figure 4:
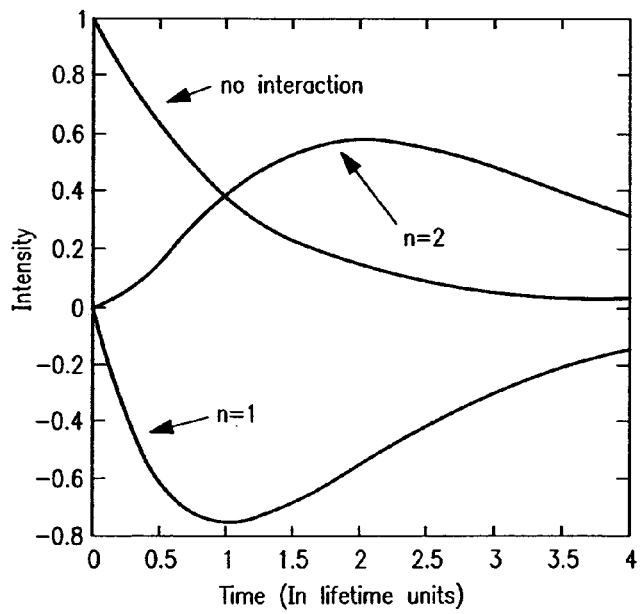

A significant feature of such experiments is the "speed-up" effect. Notice in FIG. 3 that the curve, representing experimental data, shows initially a very rapid decrease in the counting rate as a function of time. Such effects can be described, using the coherent-path model, as arising from destructive interference between the various amplitudes corresponding to the various paths the radiation takes in passing through the absorber. Using the coherent-path model it is easy to see the main cause of the "speed-up" effect. It is primarily due to the destructive interference between the n=1 path and the path corresponding to no interaction with the absorber, i.e., the first term in the above equation. The forms of the first three amplitudes are shown in FIG. 4. The so-called "dynamical beat", the small bump in FIG. 3 at time approximately equal to 1.5τ, arises from the n=2 and higher order terms.

(b) The Gamma Echo

Figure 5:
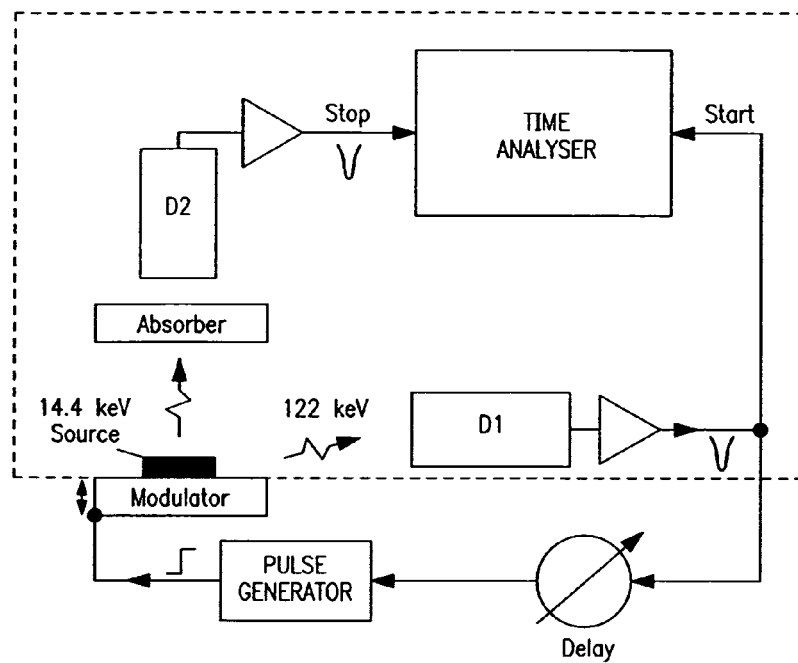

The "gamma-echo" effect, as mentioned above, was observed in the early 1990's. In the gamma-echo technique one uses the same set-up as for TDMS, but now the radioactive source is moved abruptly, with respect to a nuclear-resonant absorber, at a specific time during the lifetime of first-excited nuclear state. A schematic diagram of the gamma-echo apparatus is shown in FIG. 5. Comparing the experimental configurations shown in FIGS. 2 and 5 shows the movable-source feature, the "modulator", needed to observe the gamma echo. The modulator in FIG. 5 provides this rapid re-positioning of the source. If the source is moved abruptly a distance of ½ the wavelength of the emitted radiation, the time-dependent intensity, of radiation passing through the absorber, shows a sharp increase in the number of counts at that time, i.e., the "gamma echo."

Figure 6:
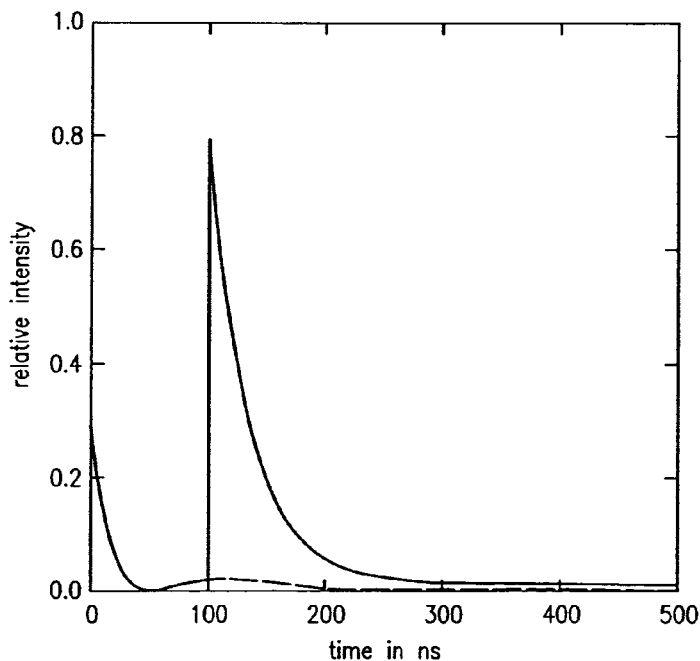

FIG. 6 shows a simulated curve representing a possible experimental result. The gamma echo can also be understood using the coherent-path model [Hoy. G. R., and Odeurs, J., 2001, Phys. Rev. B, 63, 64301].

Figure 7:
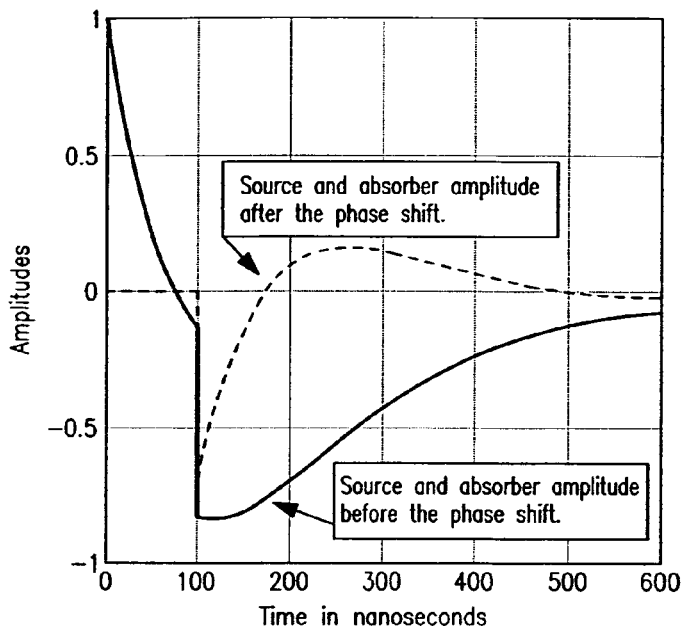

In FIG. 7 the relevant amplitudes are shown. The gamma echo appears when ones sums these amplitudes and takes the square. It is seen that the gamma echo is simply due to a π-phase-shift induced transparency. It appears that, under these conditions, there is a type of self-stimulated emission in which the radiation does not get absorbed in the absorber after the π-phase-shift. This feature shows up in the calculation as a constructive interference due to the change in sign of the various path amplitudes that, without the phase shift, gives destructive interference.

As noted above the gamma-echo effect, re-interpreted as a π phase shift transparency, provides the required "dark state" for the resonant nuclei. Therefore in the examples (See FIG. 8), the absorber in the gamma-echo set-up is replaced by a second source, i.e. the secondary source. Before the π-phase-shift, the incident radiation is absorbed in the secondary source and there will be no stimulated emission. However, after the π-phase-shift, the incident radiation can easily pass through the secondary source. Since the primary source radiation, after the π-phase-shift, can pass through the secondary source that necessarily contains many ground-state $^{57}$Fe nuclei, this radiation is available to stimulate the first excited state of the secondary source. Notice also that the phase-shift can be introduced very soon after the 14.4 keV level is formed in the primary source, i.e., there is no need to wait 100 ns to re-position the primary source. Thus the secondary source can be made transparent during almost the total lifetime of the 14.4 keV state. Thus stimulated emission can occur over that total time interval.

It is perhaps important to point out that the condition that leads to cancellation of absorption does not result in cancellation of stimulated emission. The phase relationship between the stimulating photon and stimulated photon cannot be π. If it were, there would be no lasers.

Regarding the gamma-ray laser secondary source structure, in addition to the general experimental set-up as described above, the following details of the secondary source environment should be noted. The stimulated emission cross-section is equal to the absorption cross-section. However, there may relatively few excited state nuclei in any particular secondary source. In such cases, the probability of producing stimulated emission from a single pass of the resonant radiation through the secondary source is relatively small.

However, sandwiching the secondary source between two pieces of material that will reflect the radiation back and forth through the secondary source without changing the phase of the incident radiation greatly enhances the chances of producing stimulated emission. In this case, since the coherence length of the 14.4 keV radiation is about 80 m and the sample is about 8:m, the incident radiation would make about $1 \times 10^7$ passes through the secondary source. This process would enhance the probability of producing stimulated emission enhanced by a factor of $1 \times 10^7$.

From the foregoing description, various modifications and changes in the composition and method will occur to those skilled in the art. All such modifications coming within the scope of the appended claims are intended to be included therein. The entire disclosures and contents of each and all references cited and discussed herein are expressly incorporated herein by reference. All percentages expressed herein are by weight unless otherwise indicated.

The invention claimed is:

1. A method for producing stimulated emission of gamma radiation comprising:

1] providing at least first and second gamma-radiation sources, both sources being in recoil-free first-excited nuclear levels and said second source being in resonance with said first source and the gamma radiation from said first source being incident on said second source, 2] during the lifetime of its excited state, abruptly moving said first source through a distance equal to ½ the wavelength of the radiation emitted therefrom, thereby inducing a π-phase-shift gamma radiation transparency in said second source whereby said π-phase-shifted gamma radiation stimulates the excited nuclear resonant state of said second source to emit gamma radiation.

2. The method of claim 1 wherein said sources of gamma radiation comprise any effective Mossbauer isotope.

3. The method of claim 1 wherein said secondary source positioned between two pieces of material that will reflect the radiation back and forth through the secondary source without changing the phase of the incident radiation.

4. A method for the detection and measurement of stimulated emission of gamma radiation produced by the method of claim 1 comprising placing a gamma-radiation detector behind both of said sources, measuring the gamma radiation incident on said detector and determining the excess radiation above that produced by said first and second sources without inducing a π-phase-shift gamma radiation transparency in said second source and quantifying said excess radiation as stimulated emission of gamma radiation by said second source.

5. A method for the detection of stimulated emission of gamma radiation produced by the method of claim 1 comprising placing a gamma-radiation detector behind both of said sources, comparing the pulse-height spectrum of the radiation produced by said method with the pulse-height spectrum produced by said sources without inducing a π-phase-shift gamma radiation transparency in said second source and quantifying the differences therebetween as stimulated emission of gamma radiation by said second source.

6. A system for the detection and measurement of stimulated emission of gamma radiation produced by the system of claim 1 comprising a gamma-radiation detector positioned behind both of said sources for measuring the gamma radiation incident on said detector and means for determining the excess radiation above that produced by said first and second sources without inducing a π-phase-shift gamma radiation transparency in said second source and quantifying said excess radiation as stimulated emission of gamma radiation by said second source.

7. A system for the detection of stimulated emission of gamma radiation produced by the system of claim 1 a gamma-radiation detector positioned behind both of said sources, means for comparing the pulse-height spectrum of the radiation produced by said system with the pulse-height spectrum produced by said sources without inducing a π-phase-shift gamma radiation transparency in said second source and quantifying the differences therebetween as stimulated emission of gamma radiation by said second source.

8. A system for producing stimulated emission of gamma radiation comprising:

1] at least first and second gamma-radiation sources, both sources being in recoil-free first-excited nuclear levels and positioned such that gamma radiation from said first source is incident on said second source, said second source being in resonance with said first source 2] means for abruptly moving said first source through a distance equal to ½ the wavelength of the radiation emitted from said first source, thereby inducing a π-phase-shift gamma radiation transparency in said second source to stimulate the excited nuclear resonant state of said second source to emit gamma radiation.

9. The system of claim 8 wherein the secondary source is positioned between two pieces of material that will reflect the radiation back and forth through the secondary source without changing the phase of the incident radiation.

* * * * *

UNITED STATES PATENT AND TRADEMARK OFFICE
CERTIFICATE OF CORRECTION

| | |
|---|---|
| PATENT NO. | : 7,425,706 B2 |
| APPLICATION NO. | : 11/358744 |
| DATED | : September 16, 2008 |
| INVENTOR(S) | : Gilbert R. Hoy |

Page 1 of 1

It is certified that error appears in the above-identified patent and that said Letters Patent is hereby corrected as shown below:

Title Page item 60

Please insert the following information in the application:

--<u>Cross Reference to Prior Application:</u>

This application claims priority of provisional application 60/654,471 filed on 02/22/2005.--

And insert on face of the patent:

--Priority Data: Provisional application 60/654,471 filed on 02/22/2005--

Signed and Sealed this

Twenty-eighth Day of October, 2008

JON W. DUDAS
*Director of the United States Patent and Trademark Office*